Dec. 24, 1968  L. O. KELLEY  3,417,571
DUAL TRACTOR MOUNTED, ARTICULATED CABLE LAYING DEVICE
Filed June 5, 1967  5 Sheets-Sheet 1
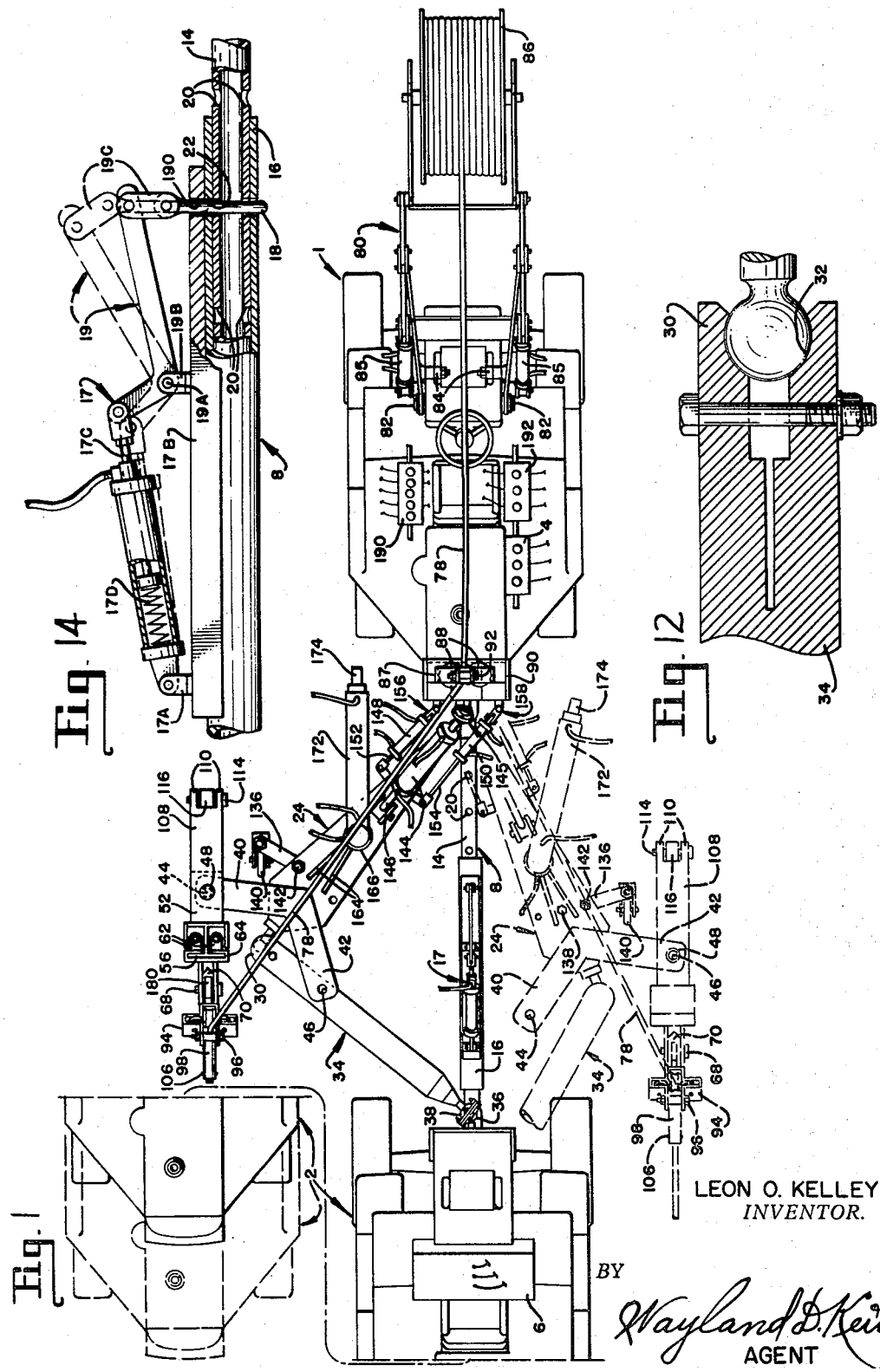
LEON O. KELLEY
INVENTOR.
BY
Wayland D. Keith
AGENT

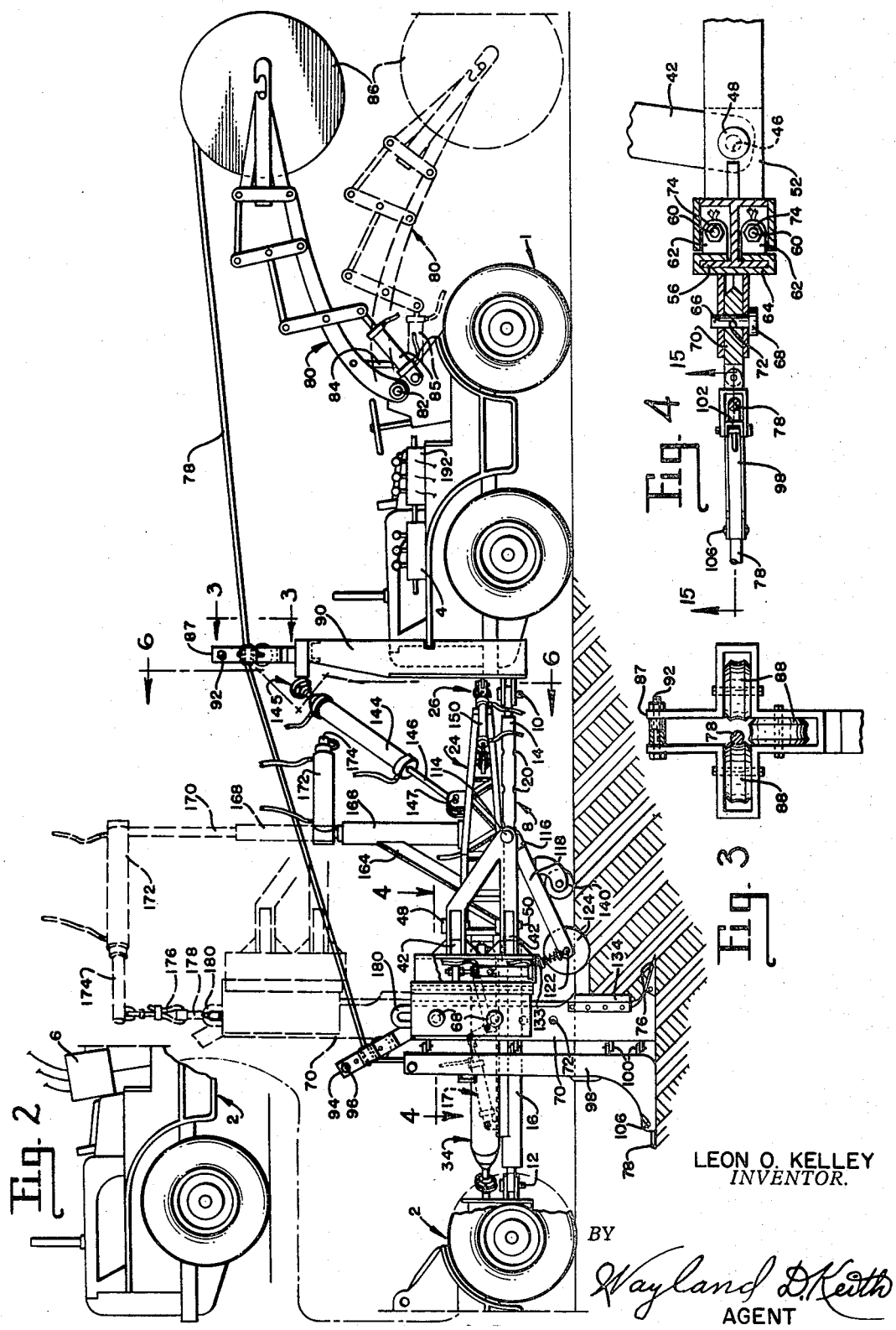

Dec. 24, 1968  L. O. KELLEY  3,417,571
DUAL TRACTOR MOUNTED, ARTICULATED CABLE LAYING DEVICE
Filed June 5, 1967  5 Sheets-Sheet 3
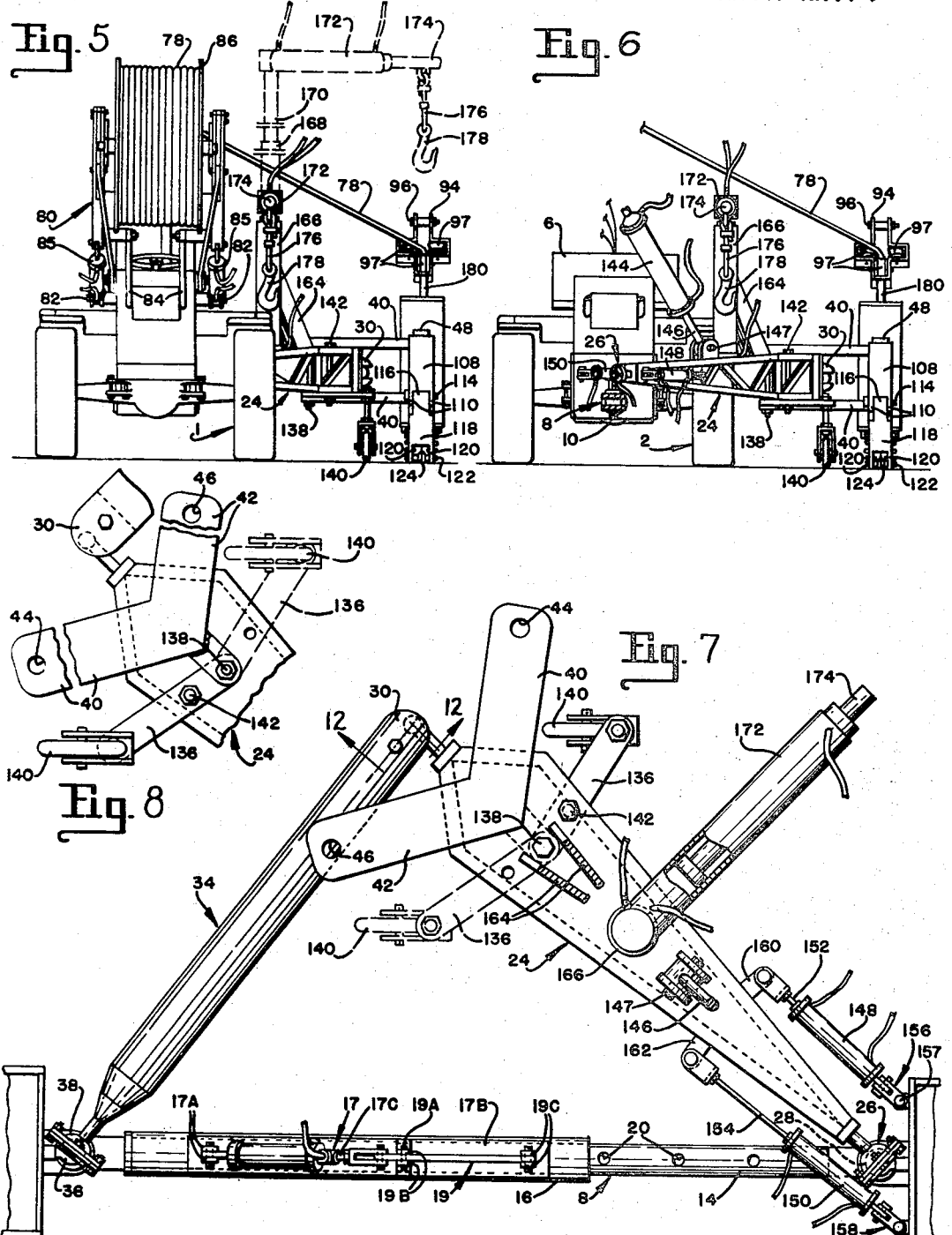
INVENTOR.
LEON O. KELLEY
BY
Wayland D. Keith
AGENT

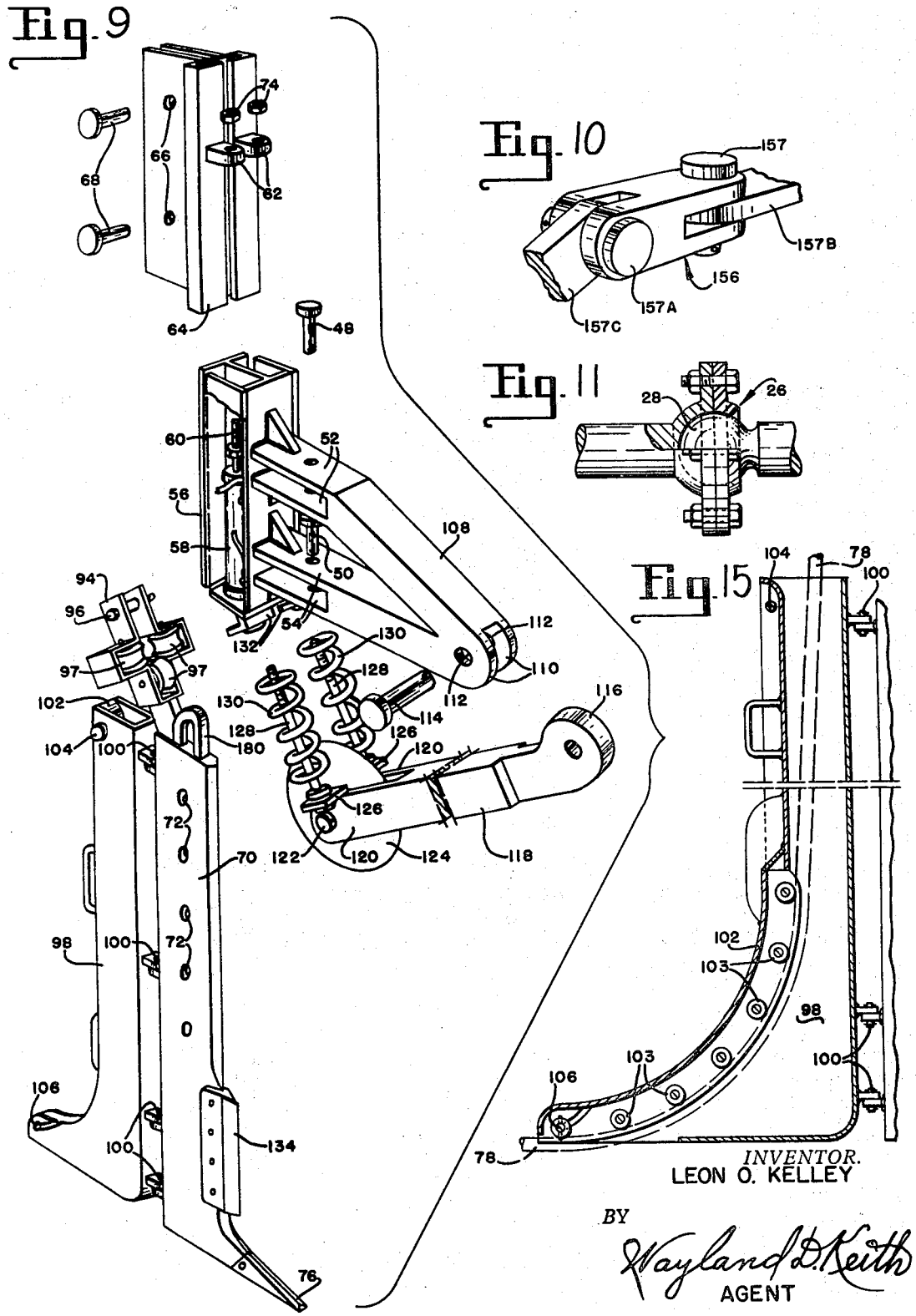

Dec. 24, 1968   L. O. KELLEY   3,417,571
DUAL TRACTOR MOUNTED, ARTICULATED CABLE LAYING DEVICE
Filed June 5, 1967   5 Sheets-Sheet 5
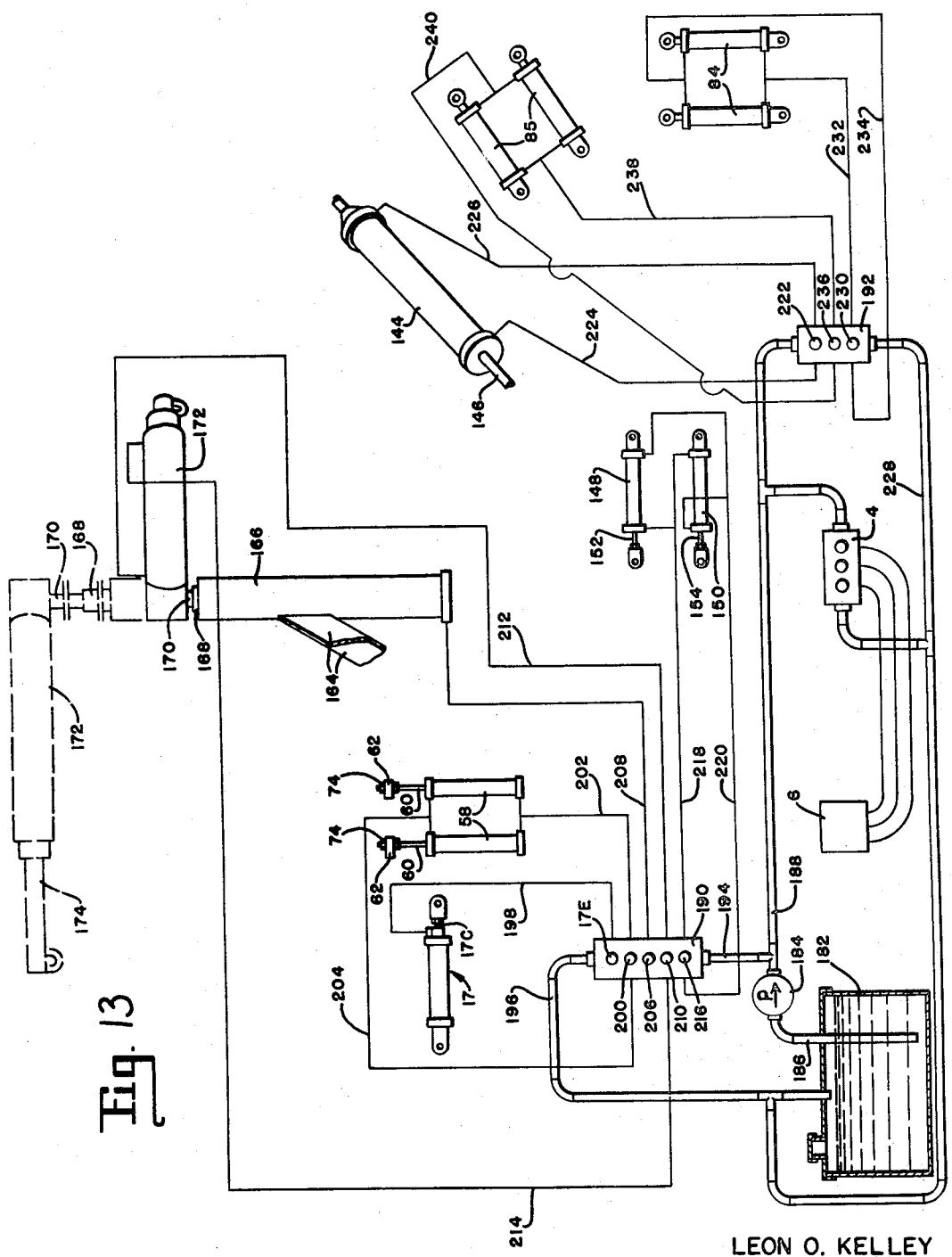
LEON O. KELLEY
*INVENTOR.*
BY
*Wayland D. Keith*
AGENT

United States Patent Office 3,417,571
Patented Dec. 24, 1968

3,417,571
DUAL TRACTOR MOUNTED, ARTICULATED
CABLE LAYING DEVICE
Leon O. Kelley, P.O. Box 488, Stamford, Tex. 79553
Filed June 5, 1967, Ser. No. 643,606
11 Claims. (Cl. 61—72.6)

ABSTRACT OF THE DISCLOSURE

A cable laying device which utilizes two spaced apart traction elements each of which are coupled in pivoted, articulated relation by an elongated, adjustable member to enable the power of the rear traction element to be transmitted in line with the movement of the traction elements to eliminate or minimize side draft. A cable laying plow support frame and plow is pivotally associated with the elongated, adjustable member to enable the plow to open a furrow and lay cable or the like to a predetermined depth in selected offset relation to a longitudinal line passing medially through the traction elements. One operator performs the various operations of the mechanisms.

SPECIFICATION

This invention relates to improvements in plows for laying cable, flexible conduit and the like, and more particularly to a dual tractor cable laying plow whereby the tractors may be synchronously controlled by a single operator, and whereby the furrow plowed may be offset from either side of a medial line through the tractors, and the depth of the furrow and the distance of the furrow outward from the medial line through the tractors can be accurately controlled by the operator.

Various cable laying plows have been proposed heretofore, but these, for the most part, were either connected in trailing relation with respect to a tractor, or they were mounted on the tractor, as disclosed in my patent No. 3,170,300, Tractor Mounted Cable Laying Plow. Furthermore, more power was required than that which could be furnished by the tractor to which the cable laying plow was attached or than was furnished by the tractor on which the plow was mounted, therefore, it was necessary either to attach additional traction elements or to use traction elements to exert pushing power to the tractor with which the cable laying plow was associated. This arrangement required at least one operator for each tractor and the work could not be properly synchronized to effect the full use of the tractors.

The present cable laying plow is so constructed that the plow is connected intermediate two tractors, with the cable being laid being supported on one of the traction elements and with a bunting bar connected intermediate the tractors so that the rear tractor can be synchronized to push against the forward tractor with the desired amount of force, with the cable laying plow being positioned intermediate the tractors and offset laterally therefrom to enable a furrow to be formed on either side of a medial line between the tractors, with an operator synchronizing the operation of the tractors so as to form a furrow and, simultaneously, lay a cable thereinto to enable the cable to be laid in close proximity to a fence, wall or the like, as the tractors move over the terrain.

An object of this invention is to provide a dual tractor cable laying plow, which enables the tractors to be controlled simultaneously to plow a furrow and lay a cable thereinto on either side of a medial line taken through the traction elements.

Another object of the invention is to provide a cable laying plow which will plow a furrow and direct a cable thereinto as the traction elements move over the terrain, which furrow is spaced outward from the normal path traversed by the wheels of the tractors.

Another object of the invention is to provide self contained, hydraulically actuated equipment on a cable laying plow to move the cable laying plow shank vertically within the plow shank socket.

A further object of the invention is to provide a fluid actuated mechanism for raising and lowering a frame which supports the cable laying plow.

Still a further object of the invention is to provide swivel connections on the frame mounting the cable laying plow to enable the distance between the tractors to be varied.

Yet another object of the invention is to provide a pivotally mounted, elongated frame, which frame is longitudinally adjustable and pivotally connected between two individually self-powered traction elements, the length of which bunting bar may be adjusted to vary the distance between the tractors and to eliminate sidedraft, as all power is transmitted in line with the movement of the traction elements.

Yet a further object of the invention is to provide a rolling disc coulter immediately ahead of the cable laying plow to open the earth to a predetermined depth.

Still another object of the invention is to provide a support for the cable laying plow mounting frame.

Yet another object of the invention is to provide a fluid actuated, adjustable crane to move the cable laying plow shank across the bunting bar when it is desired, so as to plow on the opposite side of the tractors.

Still a further object of the invention is to provide a cable laying plow, with which the power of the two tractors may be utilized simultaneously and synchronously to form a furrow and for laying cable thereinto, which furrow is offset from the medial line passing longitudinally through the tractors.

With these objects in mind and others which will become manifest as the description proceeds, reference is to be had to the accompanying drawings in which like reference characters designate like parts in the several views thereof, in which:

FIG. 1 is a top plan view of the cable laying plow mounted between dual tractors, with parts broken away, with parts shown in section, and with an alternate position of the cable laying plow and one of the tractors being shown in dashed outline;

FIG. 2 is a side elevational view of a cable laying plow positioned between dual tractors, with parts shown in alternate positions in dashed outline;

FIG. 3 is a sectional view taken on the line 3—3 of FIG. 2, looking in the direction indicated by the arrows;

FIG. 4 is a sectional view taken on the line 4—4 of FIG. 2, looking in the direction indicated by the arrows;

FIG. 5 is a front end elevational view of the forward tractor and the mechanisms associated therewith, showing the cable laying plow engaged in the ground, with associated parts being shown in dashed outline;

FIG. 6 is a sectional view taken on the line 6—6 of FIG. 2, looking in the direction indicated by the arrows;

FIG. 7 is an enlarged top plan view of the beam of the cable laying plow and the associated mechanism, but with the plow shank and the socket therefor removed, and with the plow beam support wheel being shown in full outline in one position and being shown in dashed outline in another position, and with other parts being broken away and shown in section;

FIG. 8 is an enlarged fragmentary bottom view of a portion of the mounting beam for the cable laying plow, with parts broken away and with parts shortened to bring out the details of construction, showing a beam support caster wheel in full outline in one position and in dashed in another position;

FIG. 9 is a greatly enlarged, exploded view in perspective, of the plow shank and the mounting mechanism therefor, and showing a disc coulter therefor;

FIG. 10 is a fragmentary perspective view of a universal clevis to form a connection between parts which are movable in more than one plane;

FIG. 11 is an elevational view, partly in section, of a ball and socket joint to provide universal movement;

FIG. 12 is a sectional view taken substantially on the line 12—12 of FIG. 8, looking in the direction indicated by the arrows;

FIG. 13 is a diagrammatic view of the fluid system;

FIG. 14 is an enlarged, fragmentary elevational view of a hydraulic pin actuating device; and FIG. 15 is a longitudinal sectional view taken through the cable guide member which is attached to the plow shank.

With more detailed reference to the drawings, the numeral 1 designates generally the forward tractor, and the numeral 2 designates generally a rear tractor. For purposes of illustration and representation, the tractors are shown as being of the wheeled type, however, the track laying type traction elements would fall within the scope and intent of the invention, as satisfying the necessary dual tractors to furnish power by which to operate the present cable laying plow.

The forward tractor 1 is the steered unit and the tractor 2 is the slave or driverless tractor, which tractor 2 is operated by conventional servo-actuating controls, which may either be electric or fluid operated, as is well known in the art of servo-controls.

The tractor 1 has a master servo-control unit 4 which is interconnected, by electric wires or by fluid conduits, to a servo-control unit 6 on the slave tractor 2, which will enable a single operator to operate both tractors simultaneously or individually, or a separate operator may be used for each tractor to perform the necessary manipulations of the tractor 2. The rear end of the tractor 1 and the forward end of the tractor 2 are connected by an adjustable bunting bar, which forms a portion of a longitudinally adjustable frame, which is designated generally by the numeral 8, the forward end of which bunting bar 8 is pivotally connected to tractor 1 by means of a pivot pin 10 and the rear end of which bunting bar 8 is pivotally connected to the tractor 2 by means of a pivot pin 12. A portion 14 of the bunting bar 8 telescopes into a tubular portion 16 thereof, which members 14 and 16 are held in fixed adjusted relation by a pin 18 which passes through holes 20 and 22, formed in the respective portions of the bunting bar 8.

A hydraulically actuated cylinder-plunger assembly, designated by the numeral 17, is pivotally connected, by lugs 17A, to base 17B at one end, the other end of which cylinder-plunger assembly is connected to a bell crank arrangement 19, to apply hydraulic pressure to the bell crank arrangement 19, which is pivotally mounted, by means of pin 19A to lugs 19B, which lugs are mounted on the base 17B. Upon return of plunger 17C of the cylinder-plunger assembly, the pin 18, which is pivotally connected to bell crank arrangement 19, is withdrawn from holes 20 and 22, which are in register, by manipulation of a hydraulic control valve 17E, which will be more fully brought out hereinafter. A linkage 19C is pivotally connected to the bell crank arrangement 19 and to the pin 18 to compensate for the arcuate movement of the bell crank arrangement 19, however, the pin 18 is never withdrawn from hole 19D in base 17B, therefore, upon release of hydraulic pressure, a spring 17D will urge the rounded end of pin 18 against the upper surface of the portion 14 of bunting bar 8, therefore, when one of the holes 20, in portion 14 of bunting bar 8, comes into register with hole 19D and hole 22, the pin will be urged therethrough by spring 17D acting upon plunger 17C and bell crank arrangement 19. In this manner, the operator can actuate the mechanism from his control position on the tractor. The operation of mechanism of this general character is more fully brought out in my Patent No. 3,050,135, issued Aug. 21, 1962.

By having the tractors 1 and 2 connected by the adjustable bunting bar 8, the tractor 2 may exert a pushing power on the rear of tractor 1, which will enable the cable laying plow to be stabilized between the tractors for relative movement over the terrain, but in off-set relation with respect to a longitudinal medial, vertical plane taken through the tractors. The present device enables a cable laying plow to be off-set laterally a substantial distance beyond the outer confines of the tractors, and yet the movement of the tractors and of the cable laying plow over the terrain may be accurately controlled and efficiently operated by one operator, or if desired, more than one operator may be employed.

A plow support frame, designated generally at 24, has a socket connection 26 on the forward end thereof to pivotally connect to a ball hitch member 28, however, the ball and socket hitch member 28–26 is representative of a pivot means to give universal movement, and it is understood that a universal joint such as shown in FIG. 10, shows an alternate manner of attachment to perform the required universal movement. The rear end of the plow support frame 24 has a ball joint 30 thereon, which ball joint complementally engages with socket 32 on the forward end of plow frame stabilizer bar 34. The rear end of the plow frame stabilizer bar 34 is pivotally connected to the forward end of slave tractor 2 by means of a ball and socket joint 36–38, which bar holds the rear end of the cable laying plow frame 24 in stabilized lateral position on either side of the bunting bar 8, as will be more fully brought out hereinafter. A universal arrangement can be substituted for ball and socket joint 36–38 if desired.

The plow support frame 24 has laterally extending beams 40 and 42 near the rear end thereof, each of which beams is apertured, as indicated at 44 and 46, respectively, to receive pivot pins 48 and 50 through upper and lower sets of aligned apertures in upper and lower pairs of lugs 52 and 54, respectively, and through the upper and lower apertures in the respective beams 42 and 44, so the hydraulic support member 56 will swing freely about pivot pins 48 and 50.

A pair of upright hydraulic cylinders 58 is mounted on the upright hydraulic cylinder support member 56, each of which cylinders has a plunger 60 to connect to the respective apertured lugs 62 on plow shank mounting member or frame 64, which plow shank mounting member is apertured at 66 to receive adjustment pins 68 therethrough and through holes 72 which are formed in the plow shank 70. When the plungers 60 of hydraulic cylinders 58 are connected to the respective lugs 62 by nuts 74 and the pins 68 are removed from holes 72 of the plow shank, the hydraulic plungers may be used to adjust the operating depth of the plow point 76 on the plow shank 70. The plow point 76 is symmetrically formed to open a furrow in the earth to enable cable, designated generally by the numeral 78, to be directed thereinto, as the plow moves through the earth as the tractors move over the terrain.

The forward tractor 1 has a cable spool frame 80 pivotally mounted on the forward end thereof to pivot about axial member 82. A pair of hydraulic cylinder-plunger assemblies 84 is pivotally connected to the tractor 1 at the lower end of the cylinder-plunger assemblies, with the upper ends thereof being pivotally connected to the frame 80, as will best be seen in FIGS. 2 and 5, which enables the frame 80 and a cable reel or spool 86 to be lifted from the position as shown in dashed outline in FIG. 2 to the full outline position shown therein. The cable 78 passes from cable reel 86 through cable guide member 87, having guide rollers 88 therein, which guide member 87 is mounted on upright support member 90 on the rear of tractor 1. Further hydraulic cylinder-plunger assemblies 85 are connected to the forward end of tractor 1 and to a lever-linkage arrangement 85A which is pivotally associated with frame 80, so as to move the distal end of frame 80, upon the relative movement of hydraulic cylinder-plunger assemblies 85.

A cable 78 may be passed laterally into and out of cable guide member 87 by removing bolt 92 from the guide member, as will best be seen in FIG. 3. The cable 78 passes onto a cable guide member 94, which guide member 94 is similar in construction to cable guide member 87, and by removing bolt 96 therefrom the cable can be passed laterally into and out of the cable guide member 94 without the necessity of cutting the cable. The plow shank 70 has a cable guide member 98 hingably connected thereto by pivot pins 100, which pins are in axial alignment about an upright axis. The cable guide member 98 has a removable back portion 102, which portion 102 is held in place by a pin 104 and by interengaging fastening means 106, as will best be seen in FIG. 15. By having the back portion 102 of cable guide member 98 removable, the cable can be inserted laterally thereinto and removed laterally therefrom at any time without cutting the cable. Guide rollers 103 are journaled on back portion 102 to guide the cable downward to the lower end of cable guide member 98.

A support arm 108 extends forwardly from lugs 52 and 54 and is bifurcated at the forward end thereof to form lugs, as indicated at 110, which lugs each has a transverse hole 112 therethrough to enable a pivot pin 114 to be passed therethrough and through an apertured ear 116 on the forward end of a rolling coulter support arm 118. The coulter arm 118 is bifurcated at the rear end thereof, as indicated at 120, to form rearwardly extending lugs, which lugs are transversely apertured to receive an axle pin 122 to pass therethrough and through a rolling disc coulter 124.

A lug 126 is provided on each of the lugs 120 on the upper face thereof, which lugs 126 are each apertured to receive a bolt 128 therethrough and through a compression spring 130, each which spring seats upon the upper face of a lug 126. The upper end of each spring 130 is in abutting relation which respective angulated lugs 132 on the lower end of upright support member 56, which lugs 132 are apertured to enable the respective bolts 128 to pass therethrough in sliding relation, each of which bolts receives a nut thereon above the respective lugs 132, to permit an upward yielding action of the arm 118, but with the springs 130 urging the arm 118 downwardly to cause disc coulter 124 to cut into the earth forwardly of the sharp edge 134 on the forward side of plow shank 70. The nuts 133 on the upper ends of the respective lugs 132 restrain the downward movement of arm 118 within predetermined limits on the raising of plow shank 70.

The plow support frame 24 is pivoted by universal joint means, as shown in FIG. 10, or by ball and socket joint means, as shown in FIG. 11, at each end thereof, and is pivoted by a ball and socket joint means as shown in FIG. 12, which stabilizer frame is pivoted by a universal joint 36–38 to the forward end of slave tractor 2. By actuating fluid cylinder 17 the pin 18 may be raised to disengage telescoping portions 14 and 16 of bunting bar 8, which will enable tractor 1 to be moved relative to tractor 2, which will vary the angularity of frame 34 with respect to frame 24 and also vary the lateral distance of plow shank 70 with respect to the medial line passing longitudinally through tractors 1 and 2. The telescoping portions 14 and 16 of bunting bar 8 are of such length that they may be angulated, as indicated in FIG. 1 as indicated in full and in dashed outline on either side of medial line passing longitudinally through the tractors 1 and 2, to plow a furrow in which to lay cable 78 in offset relation with respect to said longitudinal medial line.

The frame 24 has an arm 136 mounted thereon to pivot about a vertical axis of pin 138, which pivot pin lies mediate the width of frame 24 so the arm 136 may be moved into the position shown in full outline in FIG. 7, when viewed from the top, to support the frame 24, or it may be moved into the position as shown in dashed outline therein, so a caster wheel 140, mounted near the outer end, is free to pivot and to support the plow shank 70 and mechanism associated therewith, as will best be seen in FIG. 1. The plow shank 70 is supported in offset relation on either side of a medial longitudinal line passing through the tractors. The arm 136 is bolted in place by a bolt 142 to frame 24 so that the arm mounting the caster wheel 140 may be maintained in fixed relation on either side of the frame 24. When the frame 24 is on the side of the bunting bar 8, as shown in FIG. 7, the arm 136 and the caster wheel 140 will be in the position as shown in full outline in FIG. 7. However when the frame 24 and the plow shank 70 are moved into the position as shown in dashed outline in FIG. 1, the arm 136 is moved about the axis of pin 138 into the position as shown in dashed outline and is bolted in place to the frame 24 by bolt 142. The caster wheel will then be in position to support the frame 24 for movement over the terrain.

When it is desired to move the plow shank 70 and the mechanism associated therewith, the pivot pins 48 and 50 are removed from lugs 52 and 54, so as to disconnect the arms 40 therefrom to enable the plow shank 70 and the associated mechanism to be moved.

A cylinder 144 is connected to support member 90, by a universal joint 145, which support member 90 is mounted and secured to the rear end of tractor 1, as will best be seen in FIG. 2. The cylinder 144 has a plunger 146, which extends outward therefrom, which plunger is pivotally connected to frame 24 by pivot pin 147, so upon upward movement of plunger 146, the plunger will lift the frame 24 to sufficient height so the caster wheel 140 and coulter 124 will clear the bunting bar 8, which will enable the cylinders 148 and 150 to be actuated thereby to actuate the respective plungers 152 and 154. The cylinders 148 and 150 are connected to the rear end of tractor 1, a spaced distance on either side of a longitudinal, vertical plane passing medially through tractor 1, by respective universal joints 156 and 158, so as to permit lateral and vertical movement of frame 24 simultaneously with the movement of frame upward by cylinder-plunger assembly 144 and 146. Each plunger 152 and 154 is pivotally connected to the respective lugs 160 and 162 so as to shift the frames 24 and 34 from the full line position as shown in FIG. 1 to that shown in the dashed outline therein.

An upright cylinder 166 is mounted on frame 24, with angulated braces 164 extending between the cylinder 166 and the frame 24. The upright cylinder 166 has telescoping plungers 168 and 170 therein. The upper end of plunger 170 has an outwardly extending, double acting cylinder 172 mounted thereon and connected thereto, preferably at a right angle to plunger 170, which cylinder 172 has a plunger 174 therein which forms a horizontal boom. The outer end of the boom 174 has an eye 175 to which a cable 176 is attached, and from which cable a hook 178 is suspended, at the lower end thereof. The hook 178 is engageable with a loop 180 secured on the upper end of plow shank 70, which will enable the plow shank 70, and the mechanism associated therewith, to be lifted over the bunting bar 8 and the entire shank assembly 70 may be swung into place on the opposite side of the bunting bar 8, thereby to enable the beam 42, such as shown in dashed outline FIG. 1, to be connected thereto. With the plow shank in this position, the cable may be passed laterally into cable guide members 87, 94 and 98, so the rollers 88 and 97, on the respective guide members 87 and 94, will guide the cable 78 into cable guide member 98.

A hydraulic pumping system comprises a reservoir 182 and a hydraulic pump 184 for withdrawing hydraulic fluid from the reservoir through suction line 186 and discharges the hydraulic fluid into line 188, under pressure, so as to direct the hydraulic fluid to valve manifolds 190, 192 and to servo-control unit 4 on tractor 1. The detailed construction of the servo-control units 4 and 6 is not shown, as these are well known in the art of controls, and furthermore, the steering mechanisms of the respective tractors 1 and 2 may be connected for synchronous control, or they may be manually operated or individually controlled, as desired.

The valve manifold 190 has a branch conduit 194 which directs hydraulic fluid from the main hydraulic supply line 188 to the various valves therein, with the hydraulic fluid being exhausted out through discharge line 196, back to reservoir 182. A valve 17E, when in one position, directs hydraulic fluid from line 194 into line 198 to retract plunger 17C against the tension of spring 17D, when it is desired to disengage the pin 18 from bunting bar portions 14 and 16. Upon movement of valve 17E to a second position, hydraulic fluid is diverted from line 198 through by-pass into discharge line 196, and the spring 17D will urge the plunger 17C outward to cause the pin 18 to engage a selected hole 20 in bunting bar portion 14.

A three-position valve 200 is provided in valve manifold 190, whereupon, when the valve 200 is moved to one position, fluid is directed from manifold 190 into hydraulic line 202 to direct fluid into the base ends of cylinders 58 to urge the plungers 60 thereof upward to lift the plow shank 70 relative to the upright support member 56. In so doing, the hydraulic fluid will be discharged outward through hydraulic line 204 into valve manifold 190 and out through discharge line 196 to the reservoir 182. When it is desired to urge the plow shank 70 downward, the valve 200 is moved to a second position, and the hydraulic fluid will be directed from manifold 190 into line 204 into the upper ends of cylinders 58, whereupon, the plow point 76 may be moved downward to the desired depth, and the valve 200 moved to a third position to block the movement of hydraulic fluid in either direction, to hold the plow shank in static relation relative to support member 56.

When it is desired to lift the plow shank 70 relative to the plow shank mounting member 64, pins 68 are removed from holes 66 in the plow shank mounting member 64 and hook 178 is connected to loop 180, then, upon directing hydraulic pressure from manifold 190 through valve 206 into hydraulic line 208, hydraulic fluid will be directed into the lower end of cylinder 166, the plungers 168 and 170 thereof will be urged upward, however, if the hook 178 is not adjusted to the proper position horizontally, fluid is directed either through hydraulic valve 210 into hydraulic line 212 into the inner end of hydraulic cylinder 172 to urge the plunger 174, which constitutes a boom, outward, or, the hydraulic fluid may be directed, by valve 210, when in a second position, into hydraulic line 214 into the opposite end of cylinder 172, with the fluid being discharged through line 212 into valve manifold 190 and out through discharge line 196 into reservoir 182. The valve 210 is a three-position valve, and, when in the third position, fluid is prevented from moving in either direction thereby the plunger wll remain static. The cylinder-plunger assembly 166–168–170 and 172–174 may be manipulated to lift the plow shank assembly to the opposite side of the bunting bar 8, when pins 48 and 50 are removed from holes 44 or 46 in laterally extending beams 40 or 42.

After the shank has been moved to the opposite side of the bunting bar 8, the tractor 1 is moved forward relative to tractor 2, and with pin 18 in retracted position, the frames 24 and 34 will be substantially aligned with the bunting bar 8, then, by changing arm 136 to the opposite side of the plow shank support frame 24, and by moving the frames 24 and 34 laterally across the longitudinal, medial line between the two tractors, the bunting bar portion 14 may be telescoped into the portion 16 thereof until the frames 24 and 34 attain the desired position, such as indicated in dashed outline in FIG. 2, whereupon, by manipulation of valve 17E, pin 18 connects the bunting bar portions 14 and 16 in fixed relation.

To assist the movement of the frame 24 from one side of the bunting bar 8 to the other side thereof, hydraulic fluid is directed from hydraulic line 194, through hydraulic valve 216 into hydraulic line 218 so as to direct hydraulic fluid into the base of cylinder 150 and into the piston rod end of cylinder 148, which will cause a movement of frames 24 and 34, from the position as shown in full outline in FIG. 2 to that shown in dashed outline therein, and during this movement, the tractor 1 is manipulated in the manner aforementioned, to cause the movement of the tractor to be simultaneous with the movement of the frames 24 and 34. When it is desired to move the frames in the opposite direction, hydraulic fluid is directed from valve 216 to line 220, whereupon, fluid will be exhausted through line 218, through valve 216 and be directed through discharge line 196 into reservoir 182.

During the movement of the frames 24 and 34 from the positions shown in full outline in FIG. 2 to those shown in dashed outline therein, hydraulic fluid is directed from hydraulic line 182 into valve manifold assembly 192, and with valve 222 in one position, fluid will be directed from valve manifold assembly 192 into hydraulic fluid line 224 to the plunger end of cylinder 144, whereupon, plunger 146 will be retracted to elevate frames 24 and 34 until the support wheel 140 and coulter 124 clear the bunting bar 8, then, by manipulation of cylinder-plunger assemblies 148–152 and 150–154, the frames 24 and 34 will be properly located and connected to the arm 42 by means of pins 48 and 50. As the hydraulic fluid moves the plunger 146 rearwardly, the hydraulic fluid is exhausted through line 226, through valve 222 and into discharge line 228 and into the reservoir 182.

A valve 230 is provided in valve manifold 192, which valve will direct hydraulic fluid from line 188 into hydraulic line 232 and into the base end of hydraulic cylinder-plunger assemblies 84 to lift the arms 80, as hereinbefore described. The fluid is exhausted through the opposite ends of cylinder-plunger assemblies 84 into line 234 and thence through valve 230 to discharge into discharge line 228 which leads to reservoir 182.

A further valve 236 is provided in valve manifold 192 to direct hydraulic fluid from hydraulic line 188 into hydraulic line 238 into the base ends of hydraulic cylinders 85 to urge plungers therein outward, which will lift the outer end of frame 80 through a lever and linkage arrangement so as to elevate cable reel 86. Hydraulic fluid being discharged from the cylinders 85 will pass out through hydraulic line 240 to valve 236 to discharge line 228 which leads to reservoir 182.

*Operation*

With the plow shank 70 offset the desired distance from a medial, vertical, longitudinal plane passing through the tractors 1 and 2, and with the plow shank 70 adjusted to the proper depth at which it is desired to lay cable 78, the cable from cable reel 86 is passed laterally into cable guide member 87 upon the removal of bolt 92, whereupon, the cable 78 will be guided by rollers 88, upon the cable passing thereover, and with the cable being passed into guide member 94 by removal of bolt 96, the cable passes downward over guide rollers 97 into cable guide member 98, and with the back portion 102 removed from the guide member 98, the cable is passed laterally thereinto and the back portion 102 replaced and secured in place by bolt 104 and fastening means 106, whereupon, the cable will pass around arcuately spaced rollers 103 to the bottom of the ditch being made by the plow point 76. The rolling disc coulter 124 is urged downward by springs 130 to cut the surface of the terrain immediately ahead of the sharp edge 134 of the plow shank 70. While the frames 24 and 34 are shown as being connected to tractors 1 and 2 by ball and socket joints 28–26, such as shown in FIG. 11, it is to be understood that the universal joint 156, having pins 157 and 157A positioned therethrough to hingeably connect members 157B and 157C thereto, so as to enable movement about the respective axes of pins 157 and 157A to allow the universal joint to compensate for angular movement of the elements connected to the universal joint 156.

Having thus clearly shown and described the invention, what is claimed as new and desired to be secured by Letters Patent is:

1. A cable laying device for simultaneously plowing a furrow and for directing cable thereinto, including two individually self-powered traction elements, which device comprises;
   (a) an elongated frame longitudinally adjustable and pivotally connected to the rear of the forward traction element and to the forward end of the rear traction element to maintain the traction elements a spaced distance apart,
   (b) an outstanding arm associated with a side of said frame,
   (c) a plow shank mounting frame mounted on said arm,
   (d) a plow shank mounted on said plow shank mounting frame,
   (e) a cable spool frame mounted on one of the traction elements,
   (f) a cable guide member mounted on the rear side of said plow shank, and
   (g) cable guide member mounted on one of the traction elements intermediate said cable spool frame and said cable guide member on said plow shank.

2. A cable laying device as defined in claim 1; wherein
   (a) a hydraulic cylinder is mounted a spaced distance horizontally outward from and is connected, near one end, to said elongated frame, the other end of said hydraulic cylinder being associated with the rear end of the forward traction element, so upon application of hydraulic pressure to said hydraulic cylinder, said elongated frame will be moved laterally about the pivot connection between the forward end of said elongated frame and the rear of said forward traction element.

3. A cable laying device as defined in claim 1; wherein
   (a) said plow shank mounted on said plow shank support frame on said outstanding arm is pivoted about an upright axis, and
   (b) a support wheel is mounted on said elongated frame to support said frame and said arm mounting said plow shank.

4. A cable laying device as defined in claim 1; wherein
   (a) an arm is pivotally mounted on said plow shank mounting frame to pivot about a horizontal axis mediately forward of said plow shank,
   (b) a rolling coulter disc mounted on said pivoted arm and being engageable with the terrain immediately forward of said plow shank, and
   (c) spring means biased between said pivoted arm and said plow shank mounting frame to urge said disc coulter downwardly.

5. A cable laying device as defined in claim 1; wherein
   (a) an elongated bunting bar extends between the rear end of one traction element and the forward end of the other traction element,
      (1) said bunting bar being pivotally connected to said respective traction elements.

6. A cable laying device as defined in claim 5; wherein
   (a) a pair of hydraulic cylinders is pivotally mounted on said frame a spaced distance outward therefrom, each said cylinder being pivotally connected, at one end, to said elongated frame, the other ends of said respective hydraulic cylinders being pivotally connected to the rear end of the forward traction element,
      (1) hydraulic control means for selectively directing hydraulic pressure to said hydraulic cylinders to move said elongated frame laterally,
   (b) an upright support mounted on the rear end of the forward traction element,
   (c) a hydraulic cylinder connected to said upright support intermediate the length thereof at one end, and to said elongated frame, a spaced distance rearward of said pivot connection on the rear end of said forward traction element,
      (1) hydraulic control means to direct hydraulic fluid to said hydraulic cylinder to move said elongated frame relative to said upright support.

7. A cable laying device as defined in claim 5; wherein
   (a) said bunting bar is composed of two portions, one of which portions telescopes into the other of said portions, and
      (1) means selectively engaging said bunting bar portions to fixedly secure said portions together to enable varying the effective length of said bunting bar.

8. A cable laying device as defined in claim 7; wherein
   (a) said elongated frame is pivoted intermediate the length thereof.

9. A cable laying device as defined in claim 7; wherein
   (a) the portion of said bunting bar which telescopes into the other portion thereof has apertures formed therein,
      (1) said means to selectively engage said bunting bar portions is a pin adapted to pass into the portions of said bunting bar and to register with one of the holes in said inner portion to enable the selective variation of the effective length of said bunting bar, and
   (b) hydraulic cylinder means asociated with said pin to move said pin.

10. A cable laying device as defined in claim 7; wherein
    (a) an upright cylinder is mounted on said elongated frame,
       (1) said upright cylinder has a plunger therein,
    (b) hydraulic cylinder means associated with said pin in said upright cylinder upwardly,
    (c) an outwardly extending boom mounted on the upper end of said plunger of said upright cylinder, and
    (d) support means near the end of said outwardly extending boom to lift said plow shank.

11. A cable laying device defined in claim 10; wherein
    (a) said boom comprises a double acting hydraulic cylinder and plunger, and
    (b) control means for selectively controlling hydraulic pressure to said outwardly extending hydraulic cylinder.

References Cited
UNITED STATES PATENTS

| | | | |
|---|---|---|---|
| 1,829,162 | 10/1931 | Solter et al. | 61—72.6 |
| 2,118,553 | 5/1938 | Garlinger | 61—72.6 |
| 2,306,231 | 12/1942 | Smith et al. | 61—72.6 X |
| 2,663,515 | 12/1953 | Kinsinger | 61—72.6 X |
| 2,722,181 | 11/1955 | Hash | 61—72.6 |
| 3,175,368 | 3/1965 | Tibbits | 61—72.6 |
| 3,307,363 | 3/1967 | Kinnan | 61—72.6 |
| 3,308,628 | 3/1967 | Nichols | 61—72.6 |

EARL J. WITMER, *Primary Examiner.*

U.S. Cl. X.R.

62—26, 28, 39, 40